United States Patent
Yang et al.

(10) Patent No.: US 12,221,363 B2
(45) Date of Patent: *Feb. 11, 2025

(54) IN SITU OIL CLEANUP AND RECOVERY USING SMART POLYMER INTEGRATED SURFACE VESSELS

(71) Applicant: THE TRUSTEES OF THE STEVENS INSTITUTE OF TECHNOLOGY, Hoboken, NJ (US)

(72) Inventors: Eui-Hyeok Yang, Fort Lee, NJ (US); Ronald Besser, New Providence, NJ (US); Jian Xu, West Lafayette, IN (US); Wei Xu, Farmingdale, NY (US); Brendan Englot, New York, NY (US); Chang-Hwan Choi, Tenafly, NJ (US)

(73) Assignee: The Trustees of the Stevens Institute of Technology, Hoboken, NJ (US)

( * ) Notice: Subject to any disclaimer, the term of this patent is extended or adjusted under 35 U.S.C. 154(b) by 503 days.

This patent is subject to a terminal disclaimer.

(21) Appl. No.: 17/681,581

(22) Filed: Feb. 25, 2022

(65) Prior Publication Data

US 2022/0177331 A1 Jun. 9, 2022

Related U.S. Application Data

(63) Continuation-in-part of application No. 16/766,066, filed as application No. PCT/US2018/063932 on Dec. 4, 2018, now Pat. No. 11,407,657.

(Continued)

(51) Int. Cl.
C02F 1/40 (2023.01)
C02F 1/28 (2023.01)
(Continued)

(52) U.S. Cl.
CPC ............... *C02F 1/40* (2013.01); *C02F 1/285* (2013.01); *C02F 1/288* (2013.01); C02F 2101/32 (2013.01); C02F 2103/007 (2013.01)

(58) Field of Classification Search
CPC .. C02F 1/40; C02F 1/285; C02F 1/288; C02F 1/28; C02F 1/46104; C02F 2201/008;
(Continued)

(56) References Cited

U.S. PATENT DOCUMENTS

2011/0303531 A1* 12/2011 Hunter ................. H01B 1/127
204/242
2012/0248229 A1* 10/2012 Yang ................... B01F 33/3021
239/690

(Continued)

*Primary Examiner* — Akash K Varma
(74) *Attorney, Agent, or Firm* — Clark Hill, PLC; Ralph W. Selitto; John K. Kim

(57) ABSTRACT

Smart membranes are integrated into a small, unmanned surface vessel to enable the efficient, automated cleanup of oil spills. Such a vessel has the potential to provide a low-cost, modular solution for day-to-day oil-spill cleanup operations, especially in confined aquatic areas (e.g., under piers or in the small spaces between marine vessels and piers). The membranes are provided on the surface of a conveyor belt that circulates the membranes through the surrounding body of water for oil collection, as well as through an internal reduction chamber of the vessel for oil release. The smart membranes are adapted to attract and repel oil in response to low-voltage commands applied across the conveyor belt, using a process that is repeatable for a number of cycles, offering high efficiency and long durability. Segments of the conveyor belt can be electrically isolated from one another to allow disparate electrical potentials to be imposed thereon.

25 Claims, 5 Drawing Sheets

Related U.S. Application Data

(60) Provisional application No. 63/154,331, filed on Feb. 26, 2021, provisional application No. 62/594,485, filed on Dec. 4, 2017.

(51) Int. Cl.
*C02F 101/32* (2006.01)
*C02F 103/00* (2006.01)

(58) Field of Classification Search
CPC ............ C02F 2103/007; C02F 2103/00; C02F 2103/08; C02F 2301/08; C02F 2303/16; C02F 2305/04; C02F 2305/08; B82Y 30/00; Y02A 20/204
USPC ........................................................ 210/680
See application file for complete search history.

(56) References Cited

U.S. PATENT DOCUMENTS

2013/0264287 A1* 10/2013 Zhang .................. C09C 1/3081
 210/639
2023/0025974 A1 1/2023 Yang et al.

\* cited by examiner

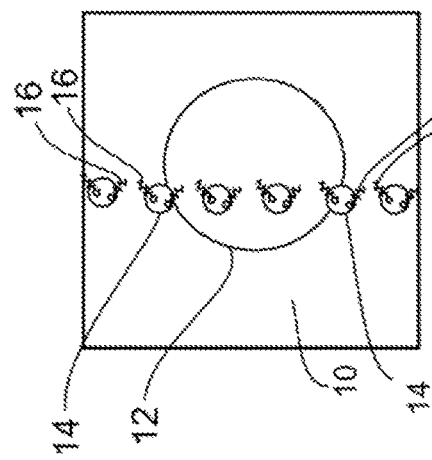
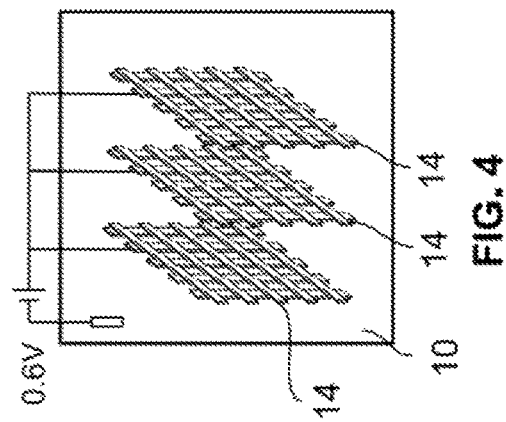
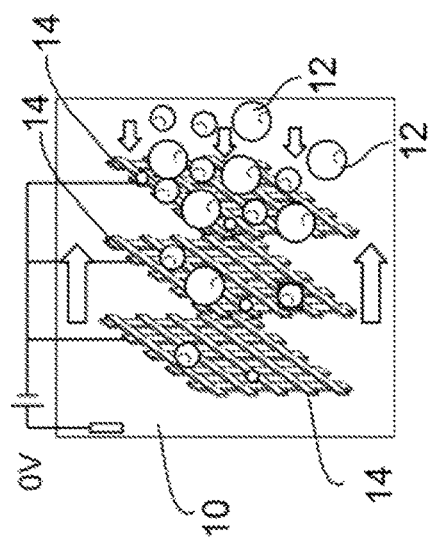
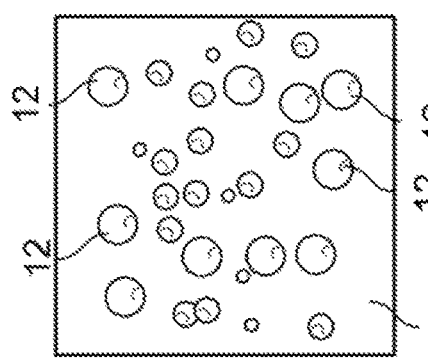
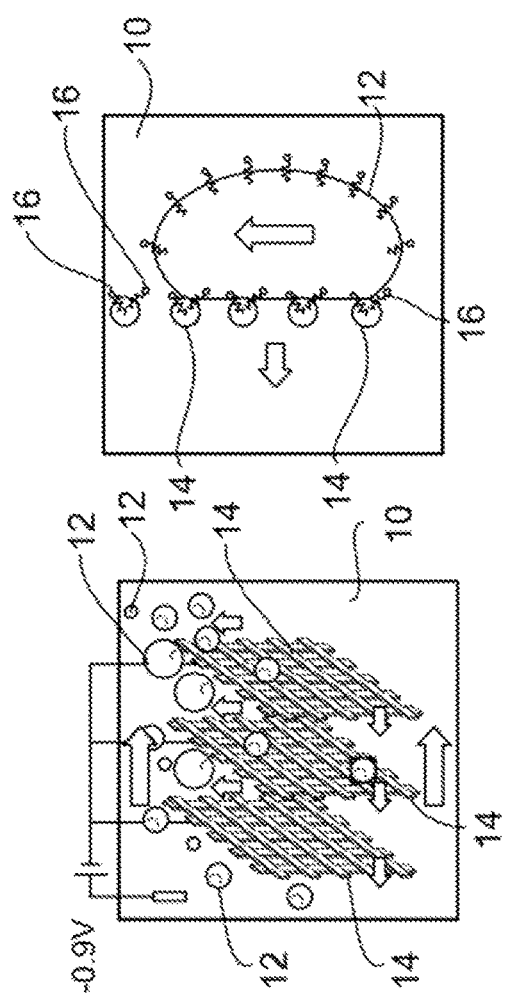
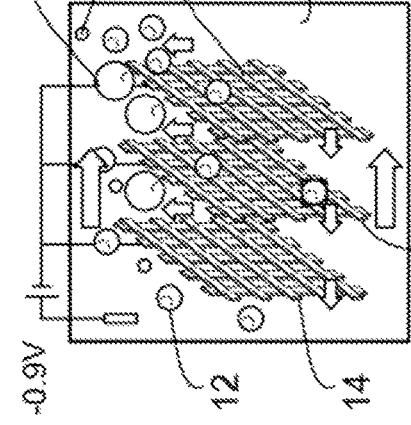

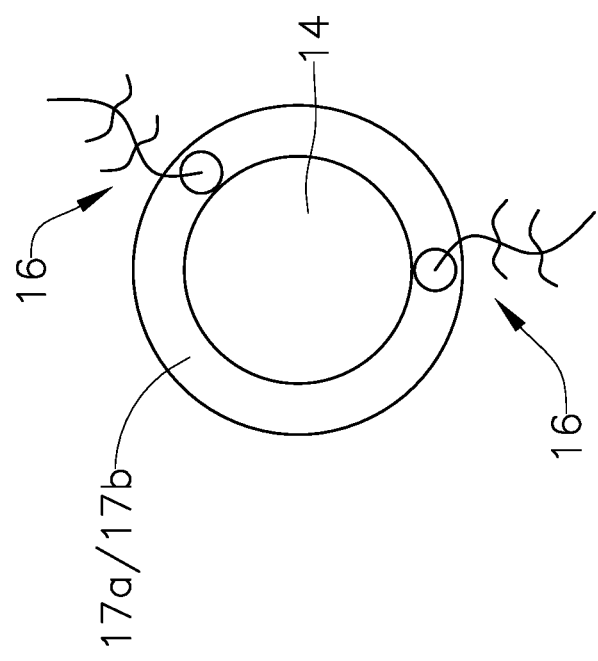

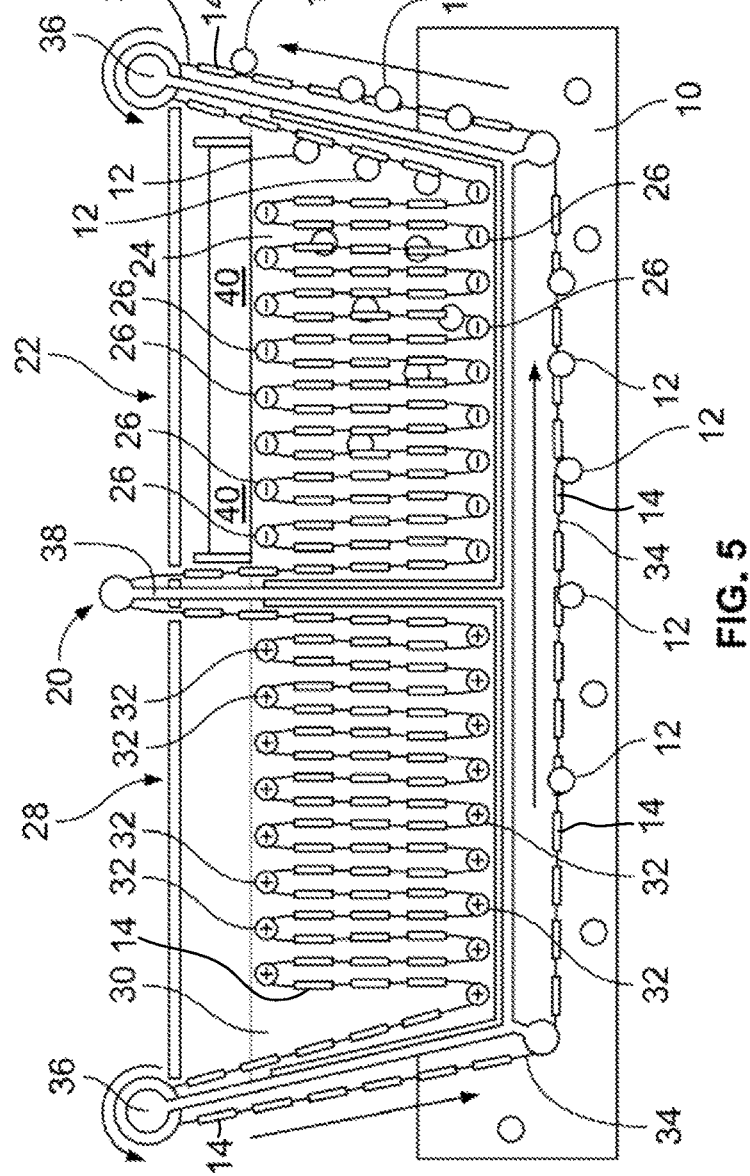
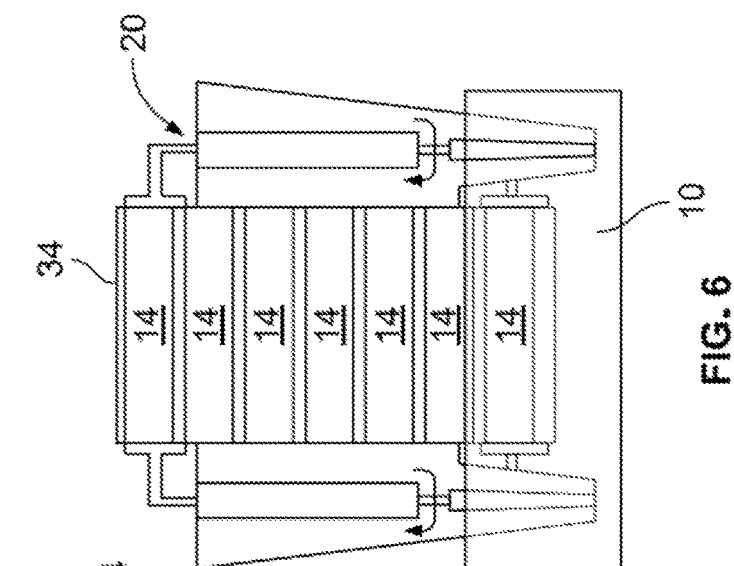
FIG. 5
FIG. 6

IN SITU OIL CLEANUP AND RECOVERY USING SMART POLYMER INTEGRATED SURFACE VESSELS

CROSS-REFERENCE TO RELATED APPLICATIONS

This application claims priority to U.S. Provisional Patent Application Ser. No. 63/154,331 filed Feb. 26, 2021 and is a continuation-in-part of U.S. patent application Ser. No. 16/766,066 filed May 21, 2020, which is an application under 35 U.S.C. § 371 of International Application No. PCT/US2018/063932 filed Dec. 4, 2018 and entitled "IN SITU OIL CLEANUP AND RECOVERY USING SMART POLYMER INTEGRATED SURFACE VESSELS," which claims priority to U.S. Provisional Patent Application Ser. No. 62/594,485 filed Dec. 4, 2017, the entire disclosures of all of which applications are incorporated herein by reference.

STATEMENT REGARDING FEDERALLY SPONSORED RESEARCH

This invention was made with government support under Grants ECCS-1202269 and EEC-1138244 awarded by the National Science Foundation and Grant FA9550-11-1-0272 awarded by the Defense University Research Instrumentation Program. The U.S. government has certain rights in the invention.

FIELD OF THE INVENTION

This invention relates to smart membranes, and, more particularly, to such membranes adapted for integration into a surface vessel for performing surface oil cleanup and recovery operations.

BACKGROUND OF THE INVENTION

There is persistent, day-to-day oil spillage into U.S. waterways that results from many sources outside of the petroleum industry, including nearly 6,000 barrels annually from marine vessels, more than 4,000 from coastal marine facilities, and more than 350,000 from urban runoff, comprised of leakage from road vehicles and other land-based sources. When oil is spilled into the ocean, waves, water currents, and wind force the oil slick to drift over larger areas, impacting the open ocean, coastal areas, and marine/terrestrial habitats in the path of the drift.

Current technologies for oil cleanup can be divided into four categories: 1) chemical methods (dispersants, solidifiers), 2) in situ burning, 3) bioremediation, and 4) mechanical recovery (booms, skimmers, and sorbents). Although some of these technologies perform well in certain applications depending on the oil's characteristics and the type of environment involved, they usually have very high material costs and sometimes have adverse effects on the environment. For example, while sorbents can trap spilled oil efficiently, they suffer from the problem of saturation.

In many ports and harbors, preventative measures are employed to minimize the impact of a potential spill. One of the most commonly used measures is pre-booming, the practice of deploying an oil boom in advance, to contain any potential spillage for easy skimming and disposal. When pre-booming is not possible due to space constraints, response vessels equipped with booms are often on standby. However, even when booms can be deployed effectively, not all areas within the boom are easily reached by a skimmer, which pumps oily water via a hose to the shore or to a larger vessel.

SUMMARY OF THE INVENTION

In one aspect, the present invention is directed to a membrane adapted for use as an oil collection apparatus. An exposed surface of the membrane includes a conjugated polymer that functions to promote the collection of oil on the exposed surface of the membrane when the conjugated polymer is oxidized. When the conjugated polymer is reduced, it functions to release oil from the exposed surface of the membrane.

The aforementioned oxidation and reduction of the conjugated polymer can be performed electrochemically, for example. Electrochemical oxidation can be performed by applying a positive voltage to the conjugated polymer, while electrochemical reduction can be performed by applying a negative voltage to the conjugated polymer. The positive electric voltage can lie in a range of from greater than 0 to about 1.5 volts, while the negative electric voltage can lie in a range of from about $-0.6$ to about $-1.5$ volts.

In an embodiment, the membrane possesses a wettability characteristic that can be varied in response to the voltage applied to the conjugated polymer during oxidation and reduction. In an embodiment, the conjugated polymer can be dodecylbenzenesulfonate-doped polypyrrole. In an embodiment, the conjugated polymer is a surfactant-doped conjugated polymer film. Alternatively, the conjugated polymer can be a freestanding, porous film fabricated via 3D printing of the conjugated polymer.

The membrane can also include a substrate cooperating with the conjugated polymer to form a composite structure. In an embodiment, the substrate can be a stainless steel mesh. The stainless steel mesh can further include carbon nanotubes grown thereon via chemical vapor deposition. In embodiments in which carbon nanotubes are used, the conjugated polymer may be coated on the carbon nanotubes via electropolymerization.

In another embodiment, the substrate can include an electrically conductive carbon foam having a porous 3D structure. In such an embodiment, the conjugated polymer would be applied to the substrate so that the conjugated polymer inherits the porosity of the conductive carbon foam.

In accordance with another aspect of the present invention, the membrane can be incorporated in a surface vessel for in situ oil clean-up of, and recovery from, a body of oil-contaminated water. The vessel can include a reduction chamber with a first reservoir of electrolyte and a first set of electrodes designed to generate a negative electric voltage. The vessel may also include an oxidation chamber with a second reservoir of electrolyte and a second set of electrodes designed to generate a positive electric voltage. In certain embodiments, the first set and/or second set of electrodes can be spring-loaded electrical contacts. A conveyor belt, which includes the aforementioned membrane and a plurality of similar membranes, can be employed in connection with an inventive method which involves the steps of: (1) passing the membranes, while in an oxidized state, through a body of oil-contaminated water to collect oil; (2) passing the membranes, with collected oil thereon, through the first reservoir of electrolyte in the reduction chamber to reduce the membranes and thereby release collected oil therefrom; and (3) then passing the membranes through the second reservoir of electrolyte in the oxidation chamber to oxidize the membranes and thereby regenerate the membranes for reuse as oil-collection agents. In some embodiments, an underlying electrode can be coated on the surface of the conveyor belt.

In one embodiment, the membranes carried by the conveyor belt can be electrochemically reduced by applying a negative electric voltage to the first set of electrodes as the conveyor belt carries the membranes through the first reservoir of electrolyte in the reduction chamber, thereby releasing collected oil into the first reservoir of electrolyte. When the conveyor belt carries the membranes from the reduction chamber to the oxidation chamber, the membranes are then electrochemically oxidized as a result of a positive electric voltage applied by the first set of electrodes, whereby surface regeneration of the membranes is effected in preparation for their reuse as oil-collection agents.

In an embodiment, the first reservoir of electrolyte in the reduction chamber and the second reservoir of electrolyte in the oxidation chamber are separated by a partition positioned between the oxidation chamber and the reduction chamber. The partition inhibits oil collected in the reduction chamber from migrating into the oxidation chamber.

Unlike the existing technologies listed in the background section hereinabove, the present invention involves the utilization of smart membranes that may be combined with a conveyor belt in a small-scale, oil-cleaning surface robot adapted to access oil spills in confined areas, such as under piers and in the small spaces between vessels and piers. In an embodiment, the smart membranes comprise: (1) conjugated polymer (e.g., dodecylbenzenesulfonate-doped polypyrrole, abbreviated as PPy(DBS)); (2) carbon nanotubes (CNTs); and (3) stainless steel (SS) mesh.

The present invention provides a potential low-cost, modular solution for day-to-day oil-spill cleanup operations in confined aquatic areas, such as those described above. Unlike current cleanup solutions, such as skimmers, which pump large volumes of oily water by hose into storage barges, the present invention incorporates smart membrane surfaces into a small, untethered automated surface vessel, enabling efficient and continuous collection of oil from the surface of a body of water. In addition to providing a solution for accessing oil spills in confined areas, a small-scale, oil-cleaning surface robot may also serve as a countermeasure for rapid water clean-up, especially in situations where a boom cannot be deployed, as such a robot can patrol the area in the vicinity of a fuel transfer.

In an embodiment, the smart membranes of the present invention exhibit tunable wettability, in the form of in situ switching of underwater wettability (i.e., affinity for organic liquid in an aqueous environment), as an oil collection agent. When electrochemically oxidized (by applying a positive voltage to the conjugated polymer), the membranes' surface has strong adhesion to oil, thereby allowing the membranes to collect oil. When reduced (by applying a negative voltage to the conjugated polymer), the membranes' surface releases the trapped oil into, for example, an interior reservoir of a surface vessel. The conjugated polymer (e.g., PPy(DBS)) switches its underwater wettability in situ upon application of voltages as low as ±1 V. When a positive electric voltage (e.g., 0.1 V) is applied, the PPy(DBS) surface is oxidized with a strong adhesion toward oils. As a result, the membranes can adsorb oils by adhering the oils on their PPy (DBS) surface. When a negative electric voltage (e.g., −0.9 V) is applied, the PPy(DBS) surface is reduced, whereby previously attached oil droplets can roll off the membranes or permeate through the membranes' mesh.

In certain embodiments, disparate electric voltages can be applied to membranes on different segments of the movable belt. This can be facilitated through use of an elastic segmented belt capable of providing an elastic mechanical response as a function of tension or compression of the segmented belt. These tension rollers can be distinct from a separate plurality of actuating rollers which can be used to move the conveyor belt. The rollers can be constructed such that the outer circumference of the roller is comprised of a conductive metallic material to apply an electric potential to at least a portion of the movable belt. Alternatively, the rollers can comprise an insulating polymeric material.

In some embodiments, the movable belt can include a plurality of individual PPy(DBS)-polymer-coated conductive segments on an insulating elastic support belt. In some embodiments, at rest, i.e., without intentionally stretching the belt, these segments can come together, forming an electrically contiguous belt. But when under sufficient tension, the segments can be drawn apart, becoming electrically isolated from one another and allowing different sections of the belt to be maintained at the disparate electrical potentials. For example, the electrical isolation can occur in the belt section between pairs of rollers. In some embodiments, this behavior allows the segmented belt in the oil release area of the collection chamber/container, or equivalent region, to be electrically isolated from the segmented belt outside of the collection chamber and biased negatively for oil release, which occurs in the collection chamber. In other embodiments, the segmented belt 120 segments can be separated by conventional mechanical linkages enabling one or more segments to be mechanically separated from one another.

The process described above can be actuated using very low voltages (<1 V) and is repeatable for a number (e.g., hundreds) of cycles, thereby resulting in high efficiency and long durability.

Furthermore, as the smart membranes of the present invention can be incorporated into a conveyor belt (e.g., a movable, segmented belt) that runs along the exterior hull of a small unmanned surface vessel, the present invention is also directed to a method which allows the aforementioned oil collection process to be automated. In certain embodiments, a suction tube, pump, or other elements can be used to extract collected oil from the collection chamber of an oil-collection apparatus made in accordance with an embodiment of the present invention. To similar ends, a vent-or-pressure line can also be employed.

Altogether, the various aspects and embodiments of the present invention enable a versatile, highly efficient, fully-automatic oil cleanup and recovery technology. An additional objective of the present invention is to allow for the collection of both light and heavy oils (i.e., oils that are lighter and heavier than water). A further object of the present invention is to provide scalability for addressing large areas covered by oil and collection of large oil volumes. A not-necessarily-final object of the present invention is to control electrical isolation to ensure the proper electrochemical state of the polymer immobilized on the segmented belt to allow absorption and release of oils.

BRIEF DESCRIPTION OF THE DRAWINGS

For a better understanding of the present invention, reference is made to the following detailed description of various exemplary embodiments considered in conjunction with the accompanying drawings, in which like structures are referred to by the like reference numerals throughout the several views, and in which:

FIG. 1 is a schematic illustration of a body of oil-contaminated water;

FIG. 2 is a schematic illustration of a plurality of oxidized polymer mesh membranes constructed in accordance with an embodiment of the present invention and operating to collect oil as a conveyor transports the membranes through the body of oil-contaminated water shown in FIG. 1;

FIG. 2A is a detailed schematic illustration showing an oil droplet adhered to the oxidized polymer surface of one of the mesh membranes illustrated in FIG. 2;

FIG. 2B is an alternate view of the schematic illustration of FIG. 2A, showing a close-up view of the mesh membrane;

FIG. 3 is a schematic illustration showing the polymer mesh membranes of FIG. 2 in a reduced stated in which collected oil is being released therefrom and therethrough;

FIG. 3A is a detailed schematic illustration showing an oil droplet being released from (e.g., by sliding or permeating) the reduced polymer surface of one of the mesh membranes illustrated in FIG. 3;

FIG. 4 is a schematic illustration showing the polymer mesh membranes of FIG. 3 in an oxidized state and ready for reuse after they have been regenerated;

FIG. 5 is a schematic illustration of an oil-cleaning surface vessel constructed in accordance with an embodiment of the present invention and showing the vessel's oxidation and reduction chambers and their interactions with a conveyor belt which comprises membranes that are similar in construction and function to those illustrated in FIGS. 2-4;

FIG. 6 is a rear schematic illustration of the surface vessel depicted in FIG. 5 showing the vessel's catamaran hull form and steering mechanism;

DETAILED DESCRIPTION OF EXEMPLARY EMBODIMENTS

Figure 7:
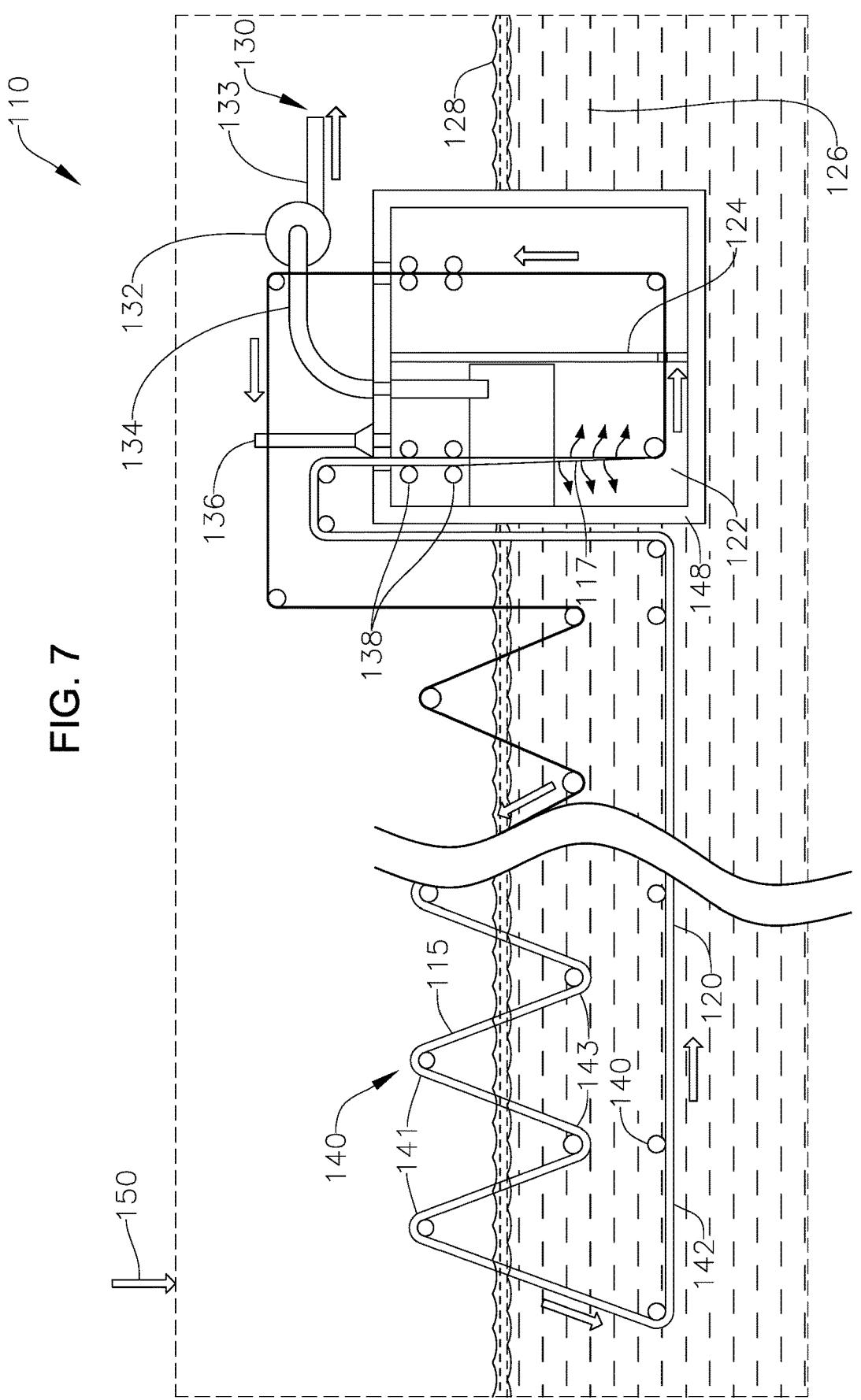
FIG. 7 is a side view, shown in cross-section, of a mobile system for collection of spilled oil from a body of water according to one embodiment of the invention.

The following disclosure is presented to provide an illustration of the general principles of the present invention and is not meant to limit, in any way, the inventive concepts and embodiments contained herein. All terms defined herein should be afforded their broadest possible interpretation, including any implied meanings as dictated by a reading of the specification as well as any words that a person having skill in the art and/or a dictionary, treatise, or similar authority would assign thereto.

Further, it should be noted that, as recited herein, the singular forms "a", "an", and "the" include the plural referents unless otherwise stated. Additionally, the terms "comprises", "comprising", "includes", "including", "has" and the like, when used herein specify that certain features are present in that embodiment; however, such terms should not be interpreted to preclude the presence or addition of additional steps, operations, features, components, and/or groups thereof.

With specific reference now to the accompanying drawings, FIGS. 1-4 represent schematic illustrations of a method involving the trap-and-release of oils and the regeneration of smart membrane surfaces in accordance with one embodiment of the present invention. In FIG. 1, a body of water (e.g., seawater) 10 is contaminated with oil 12, which is shown schematically in the form of bubbles or droplets. FIG. 2 shows the oil 12 trapped within oxidized mesh membranes 14. FIG. 2A shows an oil droplet 12 adhered to the oxidized polymer surface of one of the mesh membranes 14 illustrated in FIG. 2, wherein a DBS group 16 of the polymer has its hydrophobic tail exposed. As shown in FIG. 3, reduced polymer surfaces of the membranes 14 cause collected oil droplets 12 to be released from the membranes 14 (through sliding or permeating). FIG. 3A shows an oil droplet 12 being released from (e.g., by sliding or permeating) the reduced polymer surface of one of the mesh membranes 14 illustrated in FIG. 3, wherein the DBS group 16 of the polymer has its hydrophilic head exposed. FIG. 4 shows the membranes 14 after they have been oxidized to thereby regenerate their membrane surfaces in preparation for reuse of the membranes 14 as oil collection agents.

In an embodiment, a substrate cooperates with a conjugated polymer to form a composite mesh structure. The result is a smart membrane that includes: (1) conjugated polymer; (2) CNTs; and (3) SS mesh. On the SS mesh, CNTs 17a (see FIG. 2B) are directly grown using chemical vapor deposition to form the substrate for the conjugated polymer. Finally, the surfactant-doped conjugated polymer film is coated atop the CNTs 17a using electropolymerization to complete the composite mesh structure.

In an embodiment, multiwalled carbon nanotubes (CNTs) 17a can be directly grown from 304 stainless steel (SS) meshes (Size 200×200, McMaster-Carr, Robbinsville, NJ) using atmospheric pressure chemical vapor deposition (APCVD). SS meshes were cut, rinsed, dried and then placed in the center of a 200 quartz tube in a horizontal three zone chemical vapor deposition (CVD) furnace and heated to 750° C. under the flow of 60 sccm hydrogen (H2, Praxair, Newark, NJ) and 500 sccm Argon (Ar, Praxair, Newark, NJ). Then, additional ethylene (C2H4, Praxair, Newark, NJ) was fed through the system at flow rates of 100 sccm for 7 mins for CNTs growth. Subsequently, the samples were rapidly cooled to room temperature by blowing air into the furnace.

After CNT growth, PPy(DBS) film was electropolymerized atop the CNT-covered SS mesh surface. First, 1 mL pyrrole monomer (reagent grade, 98%, Sigma-Aldrich, St. Louis, MO) was thoroughly mixed with 150 mL 0.1 mol/L sodium dodecylbenzenesulfonate (NaDBS, technical grade, Sigma-Aldrich, St. Louis, MO) solution. Then, a CNT-covered SS mesh, a saturated calomel electrode (SCE, Fisher Scientific Inc., Pittsburgh, PA), and another SS mesh (5 cm×5 cm) were submerged in the solution as the working, reference, and counter electrode, respectively. The coating of PPy(DBS) surfaces was carried out using a potentiostat (263A, Princeton Applied Research, Oak Ridge, TN) by applying 0.7 V to the working electrode (vs. SCE) and stopped once surface charge density reached 1 C/cm$^2$. Instead of CNTs, SS meshes were deposited with 10 nm chromium (Cr) and 30 nm gold (Au) films using an e-beam evaporator (Explorer 14, Denton Vacuum, Moorestown, NJ), and then also coated with PPy(DBS) surfaces. After fabrication, the PPy(DBS) mesh surfaces were rinsed and dried in air overnight before any further characterizations.

It should be noted that CNTs are optional in the foregoing embodiment. However, the CNTs are preferred, as the in situ switch time decreases because the CNTs allow for a higher surface area, which increases the amount of DBS molecules desorbed from PPy(DBS) surfaces under reduction, thereby facilitating more rapid decrease of oil/water interfacial tension and retention force.

In another embodiment, a conductive carbon foam 17b can be used directly for PPy(DBS) electropolymerization after necessary cutting and dicing (see FIG. 2B). The pristine carbon foam 17b is extremely porous and has a 3D microstructure. It is also lightweight. The 2.5×0.5×0.2 cm carbon foam weighs only 0.025 g, compared to a 2×3 cm PPy(DBS) mesh, which weighs 0.2 g. After PPy(DBS) electropolymerization, the whole surface of carbon foam 17b can be evenly and uniformly covered with PPy(DBS) surfaces. Results show that the PPy(DBS) surface inherits the 3D porous structure of the carbon foam 17b without blocking the pores. In testing conductive carbon foam as a substrate for PPy (DBS) electropolymerization, results further show that the resulting PPy(DBS) foam exhibits much higher absorbing capacity compared with the PPy(DBS) mesh. To summarize, the PPy(DBS) foam had 3 times more absorption capacity with only 1/10 of the weight, versus the PPy(DBS) mesh. Such higher absorption capacity is attributed to the abundant surface area in the 3D porous structure of the foam 17b. By fabricating PPy(DBS) surfaces on conductive carbon foam, the absorption capacity of absorbent made of PPy(DBS) material significantly increases.

The PPy(DBS) foam's longevity was tested, and it still absorbed and released DCM oil after 100 redox cycles. Additionally, the foam proved in tests its ability to absorb and release hexane and diesel. Such 3D printed PPy(DBS) has the potential for further improving the absorbing capacity and tailoring absorbent structure for different oil cleanup scenarios, as well as the development of other applications using PPy(DBS) surfaces and its wettability characteristic that can be varied in response to changing parameters (i.e., tunable wettability).

In another embodiment, 3D printing is used to directly print PPy(DBS) materials with a 3D porous structure to form PPy(DBS) absorbents. In this way, the structure and physical/mechanical properties of PPy(DBS) absorbents can be tailored and the mass production of PPy(DBS) absorbents will be possible. In order to test the feasibility of 3D printing of PPy(DBS), the PPy(DBS) solution was prepared and later cast on flat substrates (i.e., glass slides, Au-coated Si) to form freestanding PPy(DBS) films. Then, the resulting freestanding PPy(DBS) films were tested for their tunable wettability and switchable adhesion toward oils.

To prepare the PPy(DBS) solution, PPy(DBS) surfaces must be dissolved in organic solvents. However, it is suggested that electropolymerized PPy(DBS) is insoluble in either organic or inorganic solvents due to its high degree of cross-linking. Thus, electrochemical oxidation is used instead to prepare PPy(DBS) material, in which the polymerization is started by adding oxidants (e.g., iron(III) chloride, $FeCl_3$) into the solution with pyrrole monomer and NaDBS.

With careful controlling of the molecular ratio/concentration of pyrrole/NaDBS/$FeCl_3$ and the polymerization duration, PPy(DBS) particles were synthesized and precipitated, which were then filtered out and thoroughly rinsed and dried. For example, 0.5 mL (0.0075 mL) of pyrrole monomer was mixed with 75 mL of 0.1 mol/L NaDBS solution for one hour. Then, 5 mL of 0.25 mol/L $FeCl_3$ solution was added dropwise to start the polymerization process. After 10 minutes, the precipitates were filtered out using centrifugation, washed extensively with water three times, and dried in air at 60° C. for 72 hours. Subsequently, the PPy(DBS) particles were dissolved in dimethylformamide (DMF) to form a stable suspension. To test the tunable wettability of PPy(DBS) made from electrochemical oxidization, one drop of such suspension was applied on a glass slide and dried overnight to form a freestanding film. The resulting PPy (DBS) freestanding film was then tested for tunable wettability.

This initial result suggests that the PPy(DBS) films made by a casting PPy(DBS) particle solution also exhibit tunable wettability, demonstrating the feasibility of making an oil absorbent via the 3D printing of PPy(DBS). Thus, with a careful design of the structure based on the oil cleanup requirement, the PPy(DBS) oil absorbent can be fabricated using 3D printing. Such oil absorbent can have both high absorbing capacity, as well as in situ surface regeneration ability, making it suitable for highly efficient next generation oil cleanup technology.

By way of example, DCM droplets on freestanding PPy (DBS) surfaces are characterized by a spherical shape and contact angle of ~60° when no voltage was applied to the surface. However, when −0.9V was applied, the DCM droplet exhibited flattening behavior, similar to the shape change observed in those droplets on the reduced electropolymerized PPy(DBS) surface. A DCM droplet once adhered to the oxidized PPy(DBS) surface rolled away after 60 seconds of reduction, demonstrating tunable adhesion.

Any of the smart membranes described hereinabove can be incorporated into an unmanned, robotic surface vessel adapted for oil cleaning and recovery from a body of oil-contaminated water. For purposes of discussion only, the membranes 14 will be described in connection with one practical, potentially commercial embodiment of such a vessel 20, which is shown schematically in FIGS. 5 and 6.

With particular reference now to FIGS. 5 and 6, the vessel 20 includes a reduction chamber 22 with a reservoir 24 of electrolyte and a plurality of electrodes 26 in the form of passive rollers having a negative electric voltage. The vessel 20 also includes an oxidation chamber 28 with a reservoir 30 of electrolyte and a plurality of electrodes 32 in the form of passive rollers having a positive electric voltage.

A conveyor belt 34 includes a plurality of the smart membranes 14, which are spaced apart and electrically insulated from one another along the entire length of the conveyor belt 34. Active (i.e., driven) rollers 36 function as motive means for assisting in the performance of a method which includes the following steps: (i) passing the oxidized membranes 14 through the body of oil-contaminated water 10, where the lowest submerged portion of the membranes' surface (stable in the oxidized state) collects oil droplets 12 from the body of water 10; (ii) passing the membranes 14 through the reservoir 24 of electrolyte in the reduction chamber 22, where the membranes 14 are electrochemically reduced to thereby release collected oil droplets 12 with an assist from the simultaneous application of a dynamic pressure; and (iii) passing the membranes 14 through the reservoir 30 of electrolyte in the oxidation chamber 28, where the membranes 14 are oxidized to thereby regenerate them for reuse as oil-collection agents when they are subsequently passed back into the body of oil-contaminated water 10.

In connection with the performance of the aforementioned method, the membranes 14 can be reduced in the reduction chamber 22 by applying a negative voltage (e.g., −0.9 volts) to the rollers/electrodes 26 versus a 13 mm×35 mm platinum (Pt) mesh (i.e., counter-electrode). The subsequent oxidation of the membranes 14 can be achieved by applying a positive voltage (e.g., 0.1 volt) to the rollers/electrodes 32 versus a 13 mm×35 mm platinum (Pt) mesh (i.e., counter-electrode).

A partition 38 between the reduction chamber 22 and the oxidation chamber 28 electrically insulates the two chambers from each other so that the requisite and appropriate negative and positive voltages may be applied to the membranes 14 as they pass between the reduction chamber 22 and the oxidation chamber 28, respectively. The partition 38 also creates a physical barrier that inhibits collected oil 40 in the reduction chamber 22 from migrating to the oxidation chamber 28. The collected oil 40 may be cleaned in the reduction chamber 22 to thereby avoid re-contaminating the body of water 10 outside the vessel 20.

The rollers/electrodes 26, 32 are arranged inside the reduction and oxidation chambers, 22, 28 respectively, so as to maximize the amount of collected oil 40 housed within the vessel 20. The rollers/electrodes 26, 32 also serve to support the conveyor belt 34 as it passes through the reduction and oxidation chambers 22, 28, respectively.

In addition to the active rollers 36, which function as motive means (i.e., a drive system) for the conveyor belt 34, the vessel 20 includes a simple electric propulsion system (not shown), an onboard microcontroller (not shown) supporting remote control of the drive and propulsion systems, and a lithium polymer battery (not shown). The vessel 20 is designed to be sufficiently positively buoyant to take on additional weight during the performance of an oil-collection operation.

Figure 8:
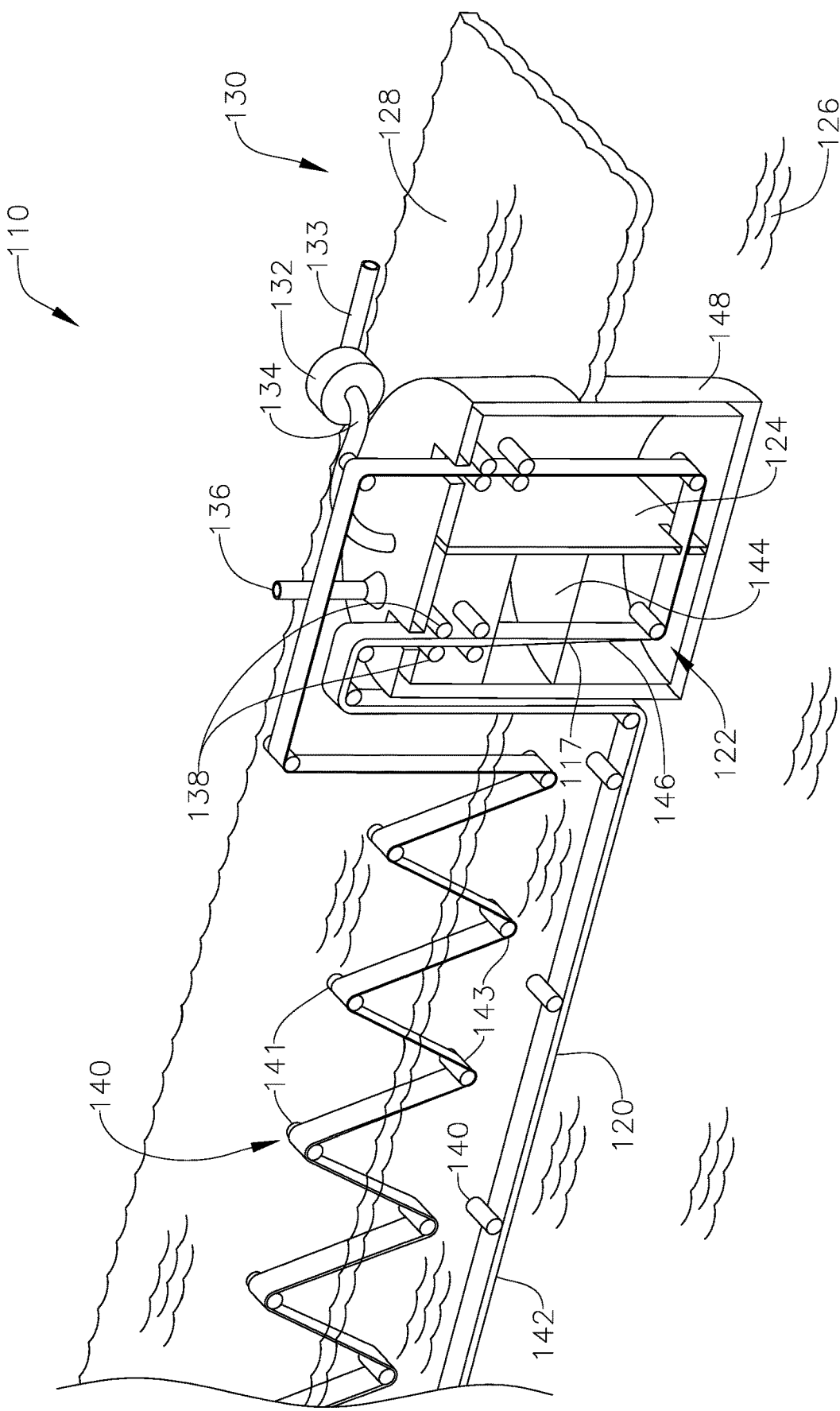
FIG. 8 is a perspective view of the mobile system of FIG. 7, FIG. 8 being shown in cross-section as well.

FIGS. 7 and 8 relate to an alternate implementation or embodiment of the present invention. In one aspect, an embodiment of the present invention is directed to a moveable belt adapted for use as an oil collection apparatus, and in a further aspect, the invention is directed to an apparatus including a moveable belt where an oxidation state of at least a portion of the belt can be controlled to enable collection and release of oil from a body of water. Configurations and procedures for voltage biasing for adherence and/or release of oil to the belt are explained hereinbelow. In an embodiment, at least a portion of the belt can possess a tunable wettability characteristic based on an oxidation or reduction state of at least a portion of the belt that can be varied in response to an applied voltage. For example, when electrochemically oxidized, (e.g., by applying a positive voltage), at least a portion of the belt's surface can include a strong adhesion to oil, thereby allowing the belt to collect oil as it is exposed to a body of water including oil. In some further embodiments, when at least a portion of the belt is reduced (e.g., by applying a negative voltage), that portion of the belt can release the trapped oil into, for example, an interior reservoir of a surface vessel. In some embodiments, like those discussed above, the belt may be combined with a conveyor belt in a small-scale, oil-cleaning surface robot adapted to access oil spills in confined areas, such as under piers and in the small spaces between vessels and piers.

Referring to FIG. 7, showing a side cross-sectional view of a mobile system 110 for collection of spilled oil 128 from a body of water 126, and FIG. 8, showing a perspective cross-sectional view of the mobile system 110 of FIG. 1 according to one embodiment of the invention, the system 110 comprises a segmented belt 120 that can be positioned to pass through the oil contaminated water 126, and then into a collection container 122. In some embodiments, the segmented belt 120 is an elastic segmented belt capable of providing an elastic mechanical response as a function of tension or compression of the segmented belt 120. In some embodiments of the invention, at least a portion of the segmented belt 120 can be coated with the polymer 15 which can be pre-oxidized in preparation for uptake of oil from a body of water. In this state, the segmented belt 120 can be prepared for uptake of the oil 128 onto the surface of the polymer 115 as the segmented belt 120 passes through any oil suspended in or on the water 126, causing it to attach to the segmented belt 120. Some embodiments of the invention include the following capabilities: 1) to be used for both light and heavy oils (i.e., oils that are lighter and heavier than water); 2) to provide scalability for addressing large areas covered by oil and collection of large oil volumes; and 3) to control electrical isolation to ensure the proper electrochemical state of the polymer 15 immobilized on the segmented belt 20 to allow absorption (by the polymer 15 in its oxidized state) and release (by polymer 15 in its reduced state) of oils.

During operation of the embodiment shown in FIGS. 7 and 8, the segmented belt 120 passes from the collection container 122 according to the direction denoted by the arrows adjacent to the belt (see arrows shown in Figure. 7). Initially, the segmented belt 120 is clean of oil and is pre-oxidized by application of a negative bias (e.g., using approximately −0.9 V) followed by a positive bias (e.g., using approximately +0.6 V) to oxidize at least the surface of the segmented belt 120, thereby making it attractive to oil. In some embodiments, movement of the segmented belt 120 through the body of water 126 can be facilitated by a series of rollers 140. The non-limiting embodiment of FIGS. 7 and 8 shows a series of rollers 140, some of which are submerged in the water 126 (e.g., rollers 143), and others of which are positioned above the surface of the water 126 (e.g., rollers 141). Further, in some embodiments, the use of an alternating arrangement of submerged rollers 143 and non-submerged rollers 141 can enable the system 110 to increase the exposure of the segmented belt 120 to the surface oil 128 because the segmented belt 120 can pass through an increased area of surface oil 128, and thus can spend more time exposed to the surface oil 128.

The non-limiting embodiment illustrated in FIG. 7 shows a break-line representing the length of the segmented belt 120 and the number of rollers 140, 141, 143, it being understood that such number can be greater than that shown. Further, the submerged rollers 140, 143 are shown that can assist in conveying the segmented belt 120, which is now an oil-carrying belt, on a return path towards the collection vessel 148. In some embodiments, the segmented belt 120 can consist of a plurality of individual conductive segments positioned on an elastic backing that can be stretched to electrically separate one or more portions of the segmented belt 120 from each other. Using this arrangement, when a section of the segmented belt 120 is un-stretched, the individual segments in the section are electrically contiguous and conductive as a whole. However, under tension, the segments separate from one another and become electrically isolated. In some embodiments, this behavior allows the segmented belt 120 in the oil release area of the collection chamber 122 to be electrically isolated from the segmented belt 120 outside of the collection chamber 122, and biased negatively for oil release, which occurs in the collection chamber 122. In other embodiments, the segmented belt 120 segments can be separated by conventional mechanical linkages enabling one or more segments to be mechanically separated from one another. In some embodiments, this enables one or more segments or portions of the segmented belt 120 to be electrically isolated from one or more other segments or portions of the segmented belt 120. In one embodiment, as the oil-carrying segmented belt 120 passes into the collection vessel 148, one or more tension rollers 138 can cause one or more sections or segments of the segmented belt 120 inside the collection vessel 148 to be stretched, and to become electrically disconnected or isolated from the other sections or segments of the segmented belt 120 (i.e., those segmented belt 120 sections not within the collection vessel 148). The stretched portion of the segmented belt 120 is represented in FIG. 7 as a region 117 of the belt with a reduced diameter of the segmented belt 120.

In some embodiments, the polymer 115 applied to at least some portions of the segmented belt 120 can comprise at least one conjugated polymer. Thus, in some embodiments, an exposed surface or layer of the segmented belt 120 can include a conjugated polymer that can function to promote the collection of oil on the exposed surface of the segmented belt 120 when the conjugated polymer is oxidized. In some embodiments, when the conjugated polymer is reduced, it can function to release oil from the exposed surface of the segmented belt 120. In some embodiments, the aforementioned oxidation and reduction of the conjugated polymer can be performed electrochemically. In some embodiments, electrochemical oxidation can be performed by applying a positive voltage to the conjugated polymer, while electrochemical reduction can be performed by applying a negative voltage to the conjugated polymer. In some embodiments, the positive electric voltage can lie in a range of from greater than 0 to about 1.5 volts, while the negative electric voltage can lie in a range of from about −0.6 to about −1.5 volts. For example, in some embodiments, the oil-coated belt section in the collection chamber 122 can be negatively biased via spring-loaded electrical contacts, releasing the oil from the belt and into the collection chamber 122, wherein it is collected as "collected oil" (see FIG. 7).

Any of the rollers shown (for example, the tension rollers 138 shown in FIG. 7) can be constructed such that the outer circumference of the roller is comprised of a conductive metallic material, or alternatively an insulating polymeric material. In embodiments where the tension rollers 138 include a conductive metallic material, the conductive surface may be used to establish electrical connection with the segmented belt 120 with which they make continuous contact. In embodiments where the rollers include an insulating surface, the insulating surface makes no electrical connection to the segmented belt 120, and thus does not change the potential of the segmented belt 120 at the point of contact.

Note that the representative rollers 138, 140, 141, 143 shown in FIGS. 1 and 2 do not encompass the entirety of rollers that would be built into the system to accommodate system design constraints such as overall system dimensions. Numerous rollers could be built into the system expressly for making redundant electrical contact; here, the rollers shown for regulating belt tension or for setting the belt path can also serve as electrical connections to the segmented belt 120. Furthermore, rollers with the characteristics described can be arbitrarily placed in any number of locations within the specific areas in which oil collection or oil release are accomplished for the purpose of setting the electrical potential in the respective location.

In some embodiments, the captured and released oil can flow to a resting position in the collection chamber 122 based on its density relative to that of the water present. For example, in one non-limiting embodiment, after passing into the collection chamber 122, at least a portion of the polymer 115 on the segmented belt 120 can be subjected to an applied negative voltage bias. For example, in some embodiments, the applied voltage bias can be approximately −0.9 V, resulting in a reduction of at least a portion of the polymer 115 on the segmented belt 120, and the consequent "oil release" as shown in FIGS. 1 and 2.

In some embodiments, as the segmented belt 120 continues out of the collection chamber 122, and through a partition 124, a positive electric voltage can be applied to oxidize the polymer 115 of the segmented belt 120 to provide a strong adhesion toward oils as it proceeds out of the collection vessel 148 and passes into a body of water through the surface oil 128 as shown in FIGS. 1 and 2. In some embodiments, the positive electric voltage can be applied directly to the polymer 115 through an underlying electrode coated on the surface of the segmented belt 120, and the water 126 can be grounded.

In an embodiment, the conjugated polymer can be dodecylbenzenesulfonate-doped polypyrrole ("PPy(DBS)"). In some embodiments, the conjugated polymer can comprise an electrically conductive dodecylbenzenesulfonate-doped polypyrrole foam, abbreviated as "PPy(DBS) foam" having a porous 3D structure. In one embodiment, the conjugated polymer is a surfactant-doped conjugated polymer film. In an embodiment, the segmented belt 120 can comprise carbon nanotubes and/or a stainless-steel mesh. For example, in some embodiments, the segmented belt 120 can also include a substrate cooperating with and/or at least partially coupled to the conjugated polymer to form a composite structure (e.g., such as a continuous conveyor belt with an applied layer of conjugated polymer).

In some embodiments, the underwater wettability of the conjugated polymer (e.g., PPy(DBS)) can be switched in-situ upon application of voltages as low as ±1 V. For example, in some embodiments, when a positive electric voltage (e.g., 0.1 V) is applied, the PPy(DBS) surface is oxidized with a strong adhesion toward oils. As a result, the segmented belt 120 can adsorb oils by adhering the oils on their PPy(DBS) surface. In further embodiments, when a negative electric voltage (e.g., −0.9 V) is applied, the PPy(DBS) surface is reduced, whereby previously attached oil droplets can roll off the segmented belt 120 or permeate through the belt's mesh.

In some embodiments, the process described above can be actuated using very low voltages (e.g., such as voltages less than 1 V), and can be repeatable for many (e.g., hundreds) of cycles, thereby resulting in high efficiency and long durability. Furthermore, as the segmented belt 120 of the present invention can be incorporated into a conveyor belt, track, rope, or chain that runs along the exterior hull of a small unmanned surface vessel (such as previously discussed unmanned surface vessel 20), the present invention is also directed to a method which allows the aforementioned oil collection process to be automated. Altogether, the various aspects and embodiments of the present invention enable a versatile, highly efficient, fully-automatic oil cleanup and recovery technology that can be provided as a boom 150 extended from a vessel (e.g., such as a boat, ship, or submersible), or alternatively from an on-shore structure such as a pier, dock, or other structure situated adjacent a body of water. Further, the boom 150 and/or any related assembly including the segmented belt 120 described herein can be incorporated into an unmanned, robotic surface vessel adapted for oil cleaning and recovery from a body of oil-contaminated water.

As discussed earlier, in some embodiments, voltages can be applied directly to the polymer through an underlying electrode coated on the surface of the conveyer belt, and the water is grounded. In some embodiments, the segmented belt 120 can include PPy(DBS)-polymer-coated conductive segments on an insulating elastic support belt. In some embodiments, at rest, i.e., without intentionally stretching the belt, these segments can come together, forming an electrically contiguous belt. However, under sufficient tension, the segments can be drawn apart, becoming electrically isolated from one another and allowing different sections of the belt to be maintained at disparate electrical potentials.

In FIG. 1, the tension rollers 138 on the left and right sides of the chamber 122 (only the left ones are labeled as 138), can allow a portion of the belt inside the chamber 122 to be electrically isolated from the section of the segmented belt 120 outside the chamber 122. The electrical isolation occurs in the belt section just between pairs of rollers. Thus, the portion of the segmented belt 120 inside the chamber 122 is biased for oil release, while the portion of the segmented belt 120 outside is biased for collection. In some embodiments, the segmented belt 120 can have an appearance similar to that of the track of a tracked military vehicle (such as a tank), or alternatively an escalator in a department store, i.e., segmented sections that move together with the proximity of segments to one another controlled by a system of tensioning rollers. The segments can be intentionally separated to produce a selective electrical isolation at that point. The purpose of the tension rollers 138 is to provide the means for electrical isolation of the belt into distinct sections, functioning separately for oil collection and oil recovery.

Some embodiments include a suction tube 134 extending from a pump 132 to the collection chamber 122. In some embodiments, the suction tube 134 can be adjusted in height to allow it to access the oil in the collection chamber 122, and to then remove it by pumping through an outlet pipe 133 (shown as oil recovery 130). Some further embodiments include a vent-or-pressure line 136 that is used to allow the system pressure in the collection chamber 122 to equilibrate with the ambient pressure. Alternatively, the pressure can be raised in the collection chamber 122 by the introduction of compressed air, nitrogen or other inert gas to provide more favorable conditions for oil removal by pumping via the pump 132.

In an embodiment, the substrate of the segmented belt 120 can be a stainless-steel mesh that can further include carbon nanotubes. In some embodiments, the carbon nanotubes can be grown thereon via chemical vapor deposition. In embodiments in which carbon nanotubes are used, the conjugated polymer may be coated on the carbon nanotubes via electropolymerization. In another embodiment, the substrate of the segmented belt 120 can include an electrically conductive carbon foam having a porous 3D structure. In such an embodiment, the conjugated polymer can be applied to the substrate so that the conjugated polymer inherits the porosity of the conductive carbon foam. In such embodiments, the CNTs and carbon foam can be applied and used in a similar matter as described hereinabove with carbon nanotubes 17*a* and carbon foam 17*b*.

It will be understood that the embodiments described herein are merely exemplary and that a person skilled in the art may make many variations and modifications without departing from the spirit and scope of the invention. All such variations and modifications are intended to be included within the scope of the invention as defined in the appended claims.

The invention claimed is:

1. A combination of a surface vessel and an oil-collection apparatus, said surface vessel adapted to float on a body of water, and said oil-collection apparatus provided on said surface vessel, said oil-collection apparatus comprising a segmented belt having a plurality of segments, at least some of said plurality of segments are electrically conductive such that each of said electrically conductive plurality of segments is oxidizable and reducible, and wherein each of said electrically conductive plurality of segments includes a membrane having a tunable oil wettability characteristic.

2. The combination of claim 1, further comprising a plurality of rollers configured to move said segmented belt about said surface vessel and through the body of water on which said surface vessel can float.

3. The combination of claim 1, wherein all of said plurality of segments are electrically conductive such that all of said plurality of segments are oxidizable and reducible and wherein all of said plurality of segments include said membrane having said tunable oil wettability characteristic.

4. The combination of claim 1, wherein each said membrane includes a polymer surface which renders each said membrane oxidizable and reducible.

5. The combination of claim 4, wherein each said polymer surface comprises a conjugated polymer, said conjugated polymer being capable of functioning to collect oil when said conjugated polymer is oxidized and that is capable of functioning to release the oil when said conjugated polymer is reduced.

6. The combination of claim 4, wherein each said membrane is configured so as to collect oil on said polymer surface thereof when said polymer surface is oxidized, and wherein each said membrane is configured to release the oil from said polymer surface thereof when said polymer surface is reduced.

7. The combination of claim 5, wherein said surface vessel further comprises a collection chamber localized therein, said collection chamber being adapted to receive released oil from a portion of said segmented belt proximate said collection chamber.

8. The combination of claim 7, further comprising a pump and a suction tube, both of which extending into said collection chamber and being configured to remove the oil therefrom.

9. The combination of claim 7, further comprising a vent-or-pressure line extending into said collection chamber.

10. The combination of claim 1, wherein said plurality of segments are mechanically and electrically isolated from one another.

11. The combination of claim 1, wherein said segmented belt is capable of providing an elastic mechanical response as a function of tension or compression of said segmented belt.

12. The combination of claim 11, wherein said plurality of segments are positioned on an elastic backing which is stretchable so as to separate each of said plurality of segments from its adjacent segments.

13. The combination of claim 12, wherein each segment of said plurality of segments is configured to be electrically isolated from its adjacent segments when said elastic backing is stretched.

14. The combination of claim 13, wherein each segment of said plurality of segments is electrically contiguous with at least one of its adjacent segments when a corresponding section of said segmented belt is unstretched.

15. The combination of claim 13, further comprising a plurality of rollers configured to stretch said elastic backing.

16. The combination of claim 15, wherein each roller of said plurality of rollers has an outer circumference made from an electrically conductive metallic material.

17. The combination of claim 15, wherein each roller of said plurality of rollers is adapted to provide a voltage to one or more segments of said plurality of segments.

18. The combination of claim 15, wherein at least one roller of said plurality of rollers comprises an insulating surface.

19. The combination of claim 1, further comprising voltage application means configured to contact said segmented belt.

20. The combination of claim 19, wherein said voltage application means comprises spring-loaded electrical contacts.

21. The combination of claim 19, wherein said voltage application means comprises an electrode coated on a surface of said segmented belt.

22. The combination of claim 1, further comprising another vessel coupled to said surface vessel for use as a boom.

23. The combination of claim 22, wherein said another vessel is adapted to be docked while said surface vessel is movable.

24. The combination of claim 22, wherein said another vessel is movable simultaneously with said surface vessel.

25. The combination of claim 1, wherein said surface vessel is an unmanned surface vessel.

* * * * *